US007580901B2

(12) United States Patent
Johnson et al.

(10) Patent No.: US 7,580,901 B2
(45) Date of Patent: Aug. 25, 2009

(54) SYSTEM AND METHOD FOR ESTIMATING TRANSITION COSTS

(75) Inventors: Randy S. Johnson, O'Fallon, MO (US); Lynn M. Koch, Tucson, AZ (US); Tedrick N. Northway, Wood River, IL (US); David A. Romero, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 11/189,935

(22) Filed: Jul. 26, 2005

(65) Prior Publication Data

US 2007/0027822 A1 Feb. 1, 2007

(51) Int. Cl.
*G06F 17/00* (2006.01)
*G06F 9/46* (2006.01)
(52) U.S. Cl. ...................................... 705/400; 718/104
(58) Field of Classification Search ................ 705/400; 718/104
See application file for complete search history.

(56) References Cited

U.S. PATENT DOCUMENTS

| 5,101,352 | A | * | 3/1992 | Rembert ........................ 705/8 |
| 5,357,439 | A | * | 10/1994 | Matsuzaki et al. ............ 700/96 |
| 5,408,663 | A | * | 4/1995 | Miller ........................ 718/104 |
| 5,799,286 | A | * | 8/1998 | Morgan et al. ................ 705/30 |
| 5,954,826 | A | * | 9/1999 | Herman et al. ................ 714/46 |
| 6,684,400 | B1 | | 1/2004 | Goode et al. .................. 725/61 |
| 6,813,611 | B1 | | 11/2004 | Herzberg et al. .............. 705/30 |
| 2003/0078798 | A1 | * | 4/2003 | Zaks et al. ...................... 705/1 |
| 2004/0199439 | A1 | | 10/2004 | Herzberg et al. .............. 705/30 |
| 2004/0261112 | A1 | | 12/2004 | Hicks, III et al. ............. 725/89 |

OTHER PUBLICATIONS

Mosig, W Richard Jr. "Software Review: Parade for DOS 4.0" Cost Engineering v38n7. pp. 7-8. Jul. 1996.*

* cited by examiner

*Primary Examiner*—John W Hayes
*Assistant Examiner*—Allen J Jung
(74) *Attorney, Agent, or Firm*—Yee & Associates, P.C.; William H. Steinberg

(57) ABSTRACT

A transition costing program (TCP) uses standardized activity tasks (SAT), standard activity estimates (SAE) for each SAT, a transition costing estimator (TCE) to develop full time equivalent (FTE) values for transitioning a customer. The TCP functions in an engagement phase, a boarding phase, and end cost variance (ECV) analysis phase so that feedback is provided to validate or modify the SAE. In the engagement phase, the TCP selects the activities necessary to transition the customer from an SAT library and enters the SAT selections into the TCE. As the SAT selections are entered, the TCE populates a display with corresponding SAE value for each task. During transition, costs are monitored by SAE, the transition is completed and the actual costs for each task are compared with the SAE value for each SAT. When the comparison shows a variance, the TCP analyzes the variance and determines whether to modify the SAE value for the SAT under review.

6 Claims, 12 Drawing Sheets

| Task | Team | Per Customer | Per Server Type 1 | Per Server Type 2 |
|---|---|---|---|---|
| Task 1 | Server | 33 | 2 | 3 |
| Task 2 | Server | 28 | 3 | 2 |
| Task 3 | Server | 13 | 5 | 6 |
| Task 4 | Server | 16 | 3 | 2 |
| Task 5 | Server | 33 | 2 | 1 |
| Task 6 | Server | 26 | 3 | 11 |
| Task 7 | Server | 32 | 13 | 12 |
| Task 8 | Server | 18 | 6 | 4 |
| Task 9 | Server | 23 | 25 | 20 |
| Task 10 | Server | 6 | 3 | 2 |
| Task 11 | Server | 18 | 4 | 7 |
| Task 12 | Server | 22 | 5 | 4 |
| Total | Server | 268 | 74 | 74 |
| Task 13 | Srv Tm2 | 11 | 13 | 10 |
| Task 14 | Srv Tm3 | 15 | 11 | 9 |
| Task 15 | Srv Tm4 | 36 | 15 | 10 |
| Total | Srv Tm5 | 62 | 39 | 29 |
| Task 14 | Srv Tm3 | 33 | 4 | 3 |
| Task 15 | Srv Tm4 | 19 | 8 | 7 |
| Task 16 | Srv Tm5 | 62 | 8 | 11 |
| Task 17 | Srv Tm6 | 39 | 2 | 1 |
| Total | Srv Tm7 | 153 | 22 | 22 |
| Server Total* | All | 483 | 135 | 125 |

FIG. 6C

| Application 662 | | Team 666 | Server Type 1 Hours 668 | | | Server Type 2 Hours 670 | | |
|---|---|---|---|---|---|---|---|---|
| | Task 664 | | App 1 | App 2 | App 3 | App 1 | App 2 | App 3 |
| | Task 1 | App Team 1 | 20 | 33 | 23 | 20 | 33 | 23 |
| | Task 2 | App Team 1 | 10 | 18 | 32 | 10 | 18 | 32 |
| | Task 3 | App Team 2 | 30 | 33 | 63 | 30 | 33 | 63 |
| | Task 4 | App Team 3 | 17 | 20 | 33 | 17 | 20 | 33 |
| | Task 5 | App Team 4 | 40 | 44 | 27 | 40 | 44 | 27 |
| | Task 6 | App Team 4 | 12 | 8 | 5 | 12 | 8 | 5 |
| 672 { Application Total (per server) | All | | 129 | 156 | 183 | 129 | 156 | 183 |

| Step #1 | Sizing | | | | | | | | Step #1 Totals | | |
|---|---|---|---|---|---|---|---|---|---|---|---|
| Transition Task Group | Hrs Per New Customer | Hrs Per Existing Customer | Hrs Per Server Type 1 | # Of Server Type 1 | Total Server Type 1 Hrs | Hrs Per Server Type 2 | # Of Server Type 2 | Total Server Type 2 Hrs | Server Labor Total | New Customer Hour Total | Existing Customer Hour Total |
| Account | 82 | 31 | 54.0 | 50.0 | 2700.0 | 35 | 50.0 | 1750.0 | 4450.0 | 4532.0 | 4481.0 |
| Architecture | 10 | 5 | 5.0 | 50.0 | 250.0 | 4 | 50.0 | 200.0 | 450.0 | 460.0 | 455.0 |
| Server Count from 0 to n1 | 483 | 483 | 135 | 50 | 6750.0 | 125.0 | 50 | 6250.0 | 13000.0 | 13483.0 | 13483.0 |
| Server Count from n2 to n3 | 242 | 242 | 81.0 | 33 | 2673.0 | 75.0 | 22 | 1650.0 | 4323.0 | 4564.5 | 4564.5 |
| Server Count from n4 to n5 | 97 | 97 | 27.0 | 50 | 1350.0 | 25.0 | 90 | 2250.0 | 3600.0 | 3696.6 | 3696.6 |
| Server Count more than n5 | 48 | 48 | 13.5 | 100 | 1350.0 | 12.5 | 150 | 1875.0 | 3225.0 | 3273.3 | 3273.3 |
| Transition | 5 | 4 | 8 | 0 | | | | | | 5 | 4 |
| Project Office | 19 | 12 | | | | | | | | 19 | 12 |
| Application 1 | 0 | 0 | 129 | 32 | 4128 | 129 | 12 | 1548 | 5676 | 5676.0 | 5676.0 |
| Application 2 | 0 | 0 | 156 | 5 | 780 | 156 | 7 | 1092 | 1872 | 1872.0 | 1872.0 |
| Application 3 | 0 | 0 | 183 | 27 | 4941 | 183 | 31 | 5673 | 10614 | 10614.0 | 10614.0 |
| Non-standard Application 1 | 0 | 0 | 45 | 5 | 225 | 30 | 4 | 120 | 345 | 345.0 | 345.0 |
| Non-standard Application 2 | 0 | 0 | 40 | 0 | 0 | 25 | 0 | 0 | 0 | 0.0 | 0.0 |
| Total | 985.4 | 921.4 | 876.5 | | 25147 | 799.5 | | 22408 | 47555 | 48540.4 | 48476.4 |

FIG. 7

| | Step #1 Totals | | Step #2 Inputs | | Step #2 Totals | | |
|---|---|---|---|---|---|---|---|
| Step #2 | _818_ New Customer Total Hrs | _820_ ExistingCustomer Total Hrs | _822_ Per Unit Hrs | _824_ # Of Units | New Customer Grand Total Hrs | or | Existing Customer Grand Total Hrs |
| Account | 4532 | 4481 | | | 4532.0 | | 4481.0 |
| Architecture | 460 | 455 | | | 460.0 | | 455.0 |
| Server Count | 25017.4 | 25017.4 | | | 25017.4 | | 25017.4 |
| Transition | 5.0 | 4.0 | | | 5.0 | | 4.0 |
| Project Office | 19.0 | 12.0 | | | 19.0 | | 12.0 |
| Application 1 | 5676.0 | 5676.0 | | | 5676.0 | | 5676.0 |
| Application 2 | 1872.0 | 1872.0 | | | 1872.0 | | 1872.0 |
| Application 3 | 10614.0 | 10614.0 | | | 10614.0 | | 10614.0 |
| Non-standard Application 1 | 345.0 | 345.0 | | | 345.0 | | 345.0 |
| Non-standard Application 2 | 0.0 | 0.0 | | | 0.0 | | 0.0 |
| Additional Task 1 | | | 0.01 | 5000 | 50.0 | | 50.0 |
| Additional Task 2 | | | 0.1 | 100 | 10.0 | | 10.0 |
| Additional Task 3 | | | 0.2 | 3234 | 646.8 | | 646.8 |
| Ongoing Task 1 | | | 0.45 | 500 | 225.0 | | 225.0 |
| Ongoing Task 2 | | | 0.35 | 33 | 11.6 | | 11.6 |
| Ongoing Task 3 | | | 0.25 | 65 | 16.3 | | 16.3 |
| Additional Product 1 | | | 25 | 0 | 0.0 | | 0.0 |
| Additional Product 2 | | | 3 | 552 | 1656.0 | | 1656.0 |
| Additional Product 3 | | | 40 | 0 | 0.0 | | 0.0 |
| Additional Product 4 | | | 20 | 93 | 1860.0 | | 1860.0 |
| Additional Product 5 | | | 20 | 0 | 0.0 | | 0.0 |
| Total Hours | 48540.4 | 48476.4 | | | 53016 | | 52952 |

FIG. 8

STEP #3 — 902

900

901
Number of Transition Months: 903 [2]

| 904 | New Customer 906 | | | OR | Existing Customer 914 | | |
|---|---|---|---|---|---|---|---|
| | 908 | 910 | 912 | | 916 | 918 | 920 |
| | Grand Total Hrs | Skill Level | Monthly FTE load | | Grand Total Hrs | Skill Level | Monthly FTE load |
| Account | 4532.0 | sk1 | 13.33 | | 4481.0 | sk1 | 13.18 |
| Architecture | 460.0 | sk92 | 1.35 | | 455.0 | sk92 | 1.34 |
| Server | 25017.4 | sk18 | 73.58 | | 25017.4 | sk18 | 73.58 |
| Transition | 5.0 | sk33 | 0.01 | | 4.0 | sk33 | 0.01 |
| Project Office | 19.0 | sk80 | 0.06 | | 12.0 | sk80 | 0.04 |
| Application 1 | 5676.0 | sk36 | 16.69 | | 5676.0 | sk36 | 16.69 |
| Application 2 | 1872.0 | sk37 | 5.51 | | 1872.0 | sk37 | 5.51 |
| Application 3 | 10614.0 | sk38 | 31.22 | | 10614.0 | sk38 | 31.22 |
| Non-standard Application 1 | 345.0 | sk48 | 1.01 | | 345.0 | sk48 | 1.01 |
| Non-standard Application 2 | 0.0 | sk48 | 0.00 | | 0.0 | sk48 | 0.00 |
| Additional Task 1 | 50.0 | sk10 | 0.15 | | 50.0 | sk10 | 0.15 |
| Additional Task 2 | 10.0 | sk11 | 0.03 | | 10.0 | sk11 | 0.03 |
| Additional Task 3 | 646.8 | sk11 | 1.90 | | 646.8 | sk11 | 1.90 |
| Ongoing Task | 252.8 | sk33 | 0.74 | | 252.8 | sk33 | 0.74 |
| Additional Product 1 | 0.0 | sk23 | 0.00 | | 0.0 | sk23 | 0.00 |
| Additional Product 2 | 1656.0 | sk11 | 4.87 | | 1656.0 | sk11 | 4.87 |
| Additional Product 3 | 0.0 | sk44 | 0.00 | | 0.0 | sk44 | 0.00 |
| Additional Product 4 | 1860.0 | sk36 | 5.47 | | 1860.0 | sk36 | 5.47 |
| Additional Product 5 | 0.0 | sk32 | 0.00 | | 0.0 | sk32 | 0.00 |
| Total Monthly FTE | | | 155.93 | | | | 155.74 |

SYSTEM AND METHOD FOR ESTIMATING TRANSITION COSTS

FIELD OF THE INVENTION

The present invention relates generally to estimation support for electrical computers and digital processing systems, and specifically to providing a cost transition model in an on-demand operating system environment.

BACKGROUND OF THE INVENTION

For many years, information technology (IT) organizations (the "providers") have offered IT management services and computing resources to other business entities (the "customers"). In a "traditional" service model, the customers share a provider's management services, but each customer purchases or leases specific resources for the customer's exclusive benefit. The customer may purchase or lease the resources directly from the provider or from a third party. Regardless of their origins, though, such a purchase or lease may require extensive, time-consuming negotiations based upon the customer's anticipated requirements. If the customer's requirements are less than anticipated, then the customer effectively has wasted resources. If, however, the customer's requirements are greater than anticipated, then the customer may have to enter into additional time-consuming negotiations for the necessary resources.

Alternatives to the traditional service model, though, are able to anticipate and meet customers' processing needs as their requirements grow, while maximizing existing resources. One such alternative, pioneered by International Business Machines Corporation, allows a service provider to allocate resources to customers "on-demand" as the customers' needs change. In this on-demand service model, customers share computing and networking resources. In one implementation of the on-demand model, a service provider creates "logical" partitions of computing resources on primary processing units (commonly known as "mainframe" computers). Typically, an on-demand service provider contracts with several customers to provide a certain level of service to each customer, and creates a logical partition (LPAR) of resources for each customer to fulfill its obligations. Unlike traditional service contracts, an on-demand service contract generally requires that the customer be billed only for resources actually used, and for fixed costs not directly related to usage (such as labor costs incurred in support of the contract).

Generally, the on-demand provider delivers services based upon a contract that allows a variance of utilization. The provider delivers the requested services without regard to the physical resources used to provide those services. The customer does not purchase or lease the physical resources; instead, the provider retains the discretion to allocate the resources to logical partitions as needed to meet its service obligations. Typically, the provider establishes threshold levels of service that guide dynamic allocation of resources. Although on-demand customers may share a provider's services and computing resources, the provider generally must segregate and protect each customer's data.

In an on-demand data center, software is shared, simultaneously serving multiple customers in a flexible, automated fashion. The software is standardized, requiring little customization, and it is scalable, providing capacity on demand in a pay-as-you-go model. The software can be stored on a shared file system accessible from one or more servers. The software is executed via transactions that contain data and server processing requests that use processing resources on the accessed server. The accessed server also may make requests of other servers that require the use of processing resources. The use or consumption of processing resources is measured in units of time such as minutes, seconds, or hours. A CPU is one example of a processing resource, but other resources that may be consumed and measured include (but are not limited to) network bandwidth, memory, storage, packet transfers, complete transactions, etc.

In order to create service contracts efficiently, automated engagement tools may be utilized. For example, International Business Machines Corporation uses the Solution Advisor Global Edition (SAGE) as an engagement tool. International Business Machines On Demand offerings are standardized for all on demand engagements which makes cost calculations for the service engagement rapid and accurate. Delivery plan templates can be used in order to further reduce the time and costs for the engagement. But these delivery templates address on going operations. In order to provide services in an on-demand environment, the service provider must first transition the customer from the customer's old IT environment to the on-demand environment. As used herein, transition means defining the resources to be applied to the customer's need for a service contract, placing the customer's data and resources in operation, and getting the customer to operate routinely within the on demand environment. Moreover, as used herein, the term transition may mean setting up a new customer (boarding) or adding services to an existing customer.

In order to efficiently effect a customer transition, an accurate estimate of the cost, in hours, to effect the transition must be calculated. To create the accurate estimate, service providers rely upon subject matter experts (SME). SMEs are persons familiar with the specific tasks to be accomplished and who can provide an accurate estimate for the tasks for which that person has expertise. Tasks are enumerated, and then SMEs are consulted in order to create the estimates. The process can take several days, and quality assurance reviews can add additional time. Therefore, calculation of the cost in hours to set up (board) a new customer or to add additional services to an existing customer in the on demand environment can be time consuming and costly. A need exists for an improved transition costing process that can be accomplished in hours instead of days. The estimation process would be improved by standardization, if such standardization were subjected to quality control and feedback for accuracy.

SUMMARY OF THE INVENTION

The invention that meets the needs identified above is a transition costing program (TCP) that uses standardized activity tasks (SAT), standard activity estimates (SAE) for each SAT, a transition costing estimator (TCE) to develop full time equivalent (FTE) values for transitioning a customer. The TCP functions in an engagement phase, a boarding phase, and end cost variance (ECV) analysis phase so that feedback is provided to validate or modify the SAE. In the engagement phase, the TCP selects the activities necessary to transition the customer from an SAT library and enters the SAT selections into the TCE. As the SAT selections are entered, the TCE populates a display with corresponding SAE value for each task. During transition, costs are monitored by SAE, the transition is completed and the actual costs for each task are compared with the SAE value for each SAT. When the comparison shows a variance, the TCP analyzes the variance and determines whether to modify the SAE value for the SAT under review.

The TCE may be employed in three steps. First, a user enters tasks into the TCE using four tabs: account setup, transition architecture, server setup, and application setup. At each tab, tasks are entered from the SAT library and corresponding teams are entered so that tasks are identified for each new customer, each existing customer, each type 1 server and each type 2 server. The entries from these four tabs are then summarized in a summary table. The number of type 1 servers and the number of type 2 servers are entered. In step 2, optional server items, including standard applications and non-standard applications, may also be entered. In addition, other standard items such as data transfer, production control, and backups are entered. The TCE populates the display with the corresponding SAE values and totals the columns. Third, the TCE displays grand totals for each task by new customer and existing customer along with a new column for skill levels. Skill levels may be entered manually, or the skill levels may be populated from a skill level (SKL) library where skill levels are associated with particular tasks. The total tasks hours are converted into Full Time Equivalents (FTE) based upon the skill levels and total monthly FTEs are displayed. The total monthly FTEs can then be entered into an engagement tool for further processing. An assumptions tab is used to enumerate assumptions made in entering the data for server types and how unusual circumstances were handled.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 6C depicts the server tab of the transition costing estimator.

FIG. 6D depicts the application tab of the transition costing estimator.

FIG. 7 depicts step 1 of the transition costing estimator.

FIG. 8 depicts step 2 of the transition costing estimator.

FIG. 9 depicts step 3 of the transition costing estimator.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Transition Costing Program (TCP).

Figure 1:
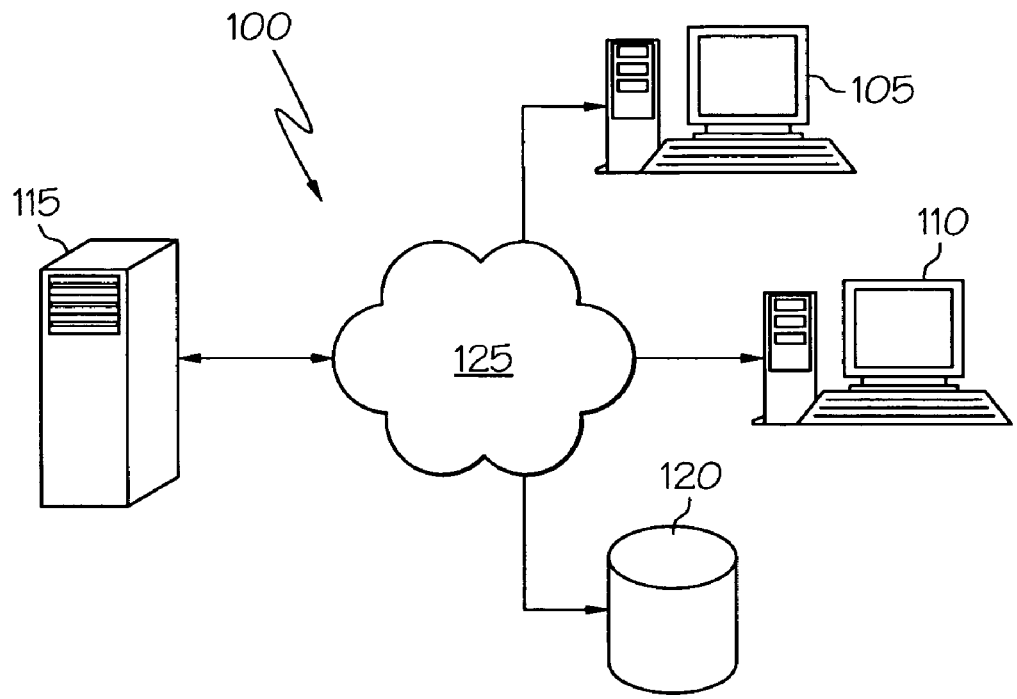
FIG. 1 illustrates an example network configuration.

Additionally, the TCP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
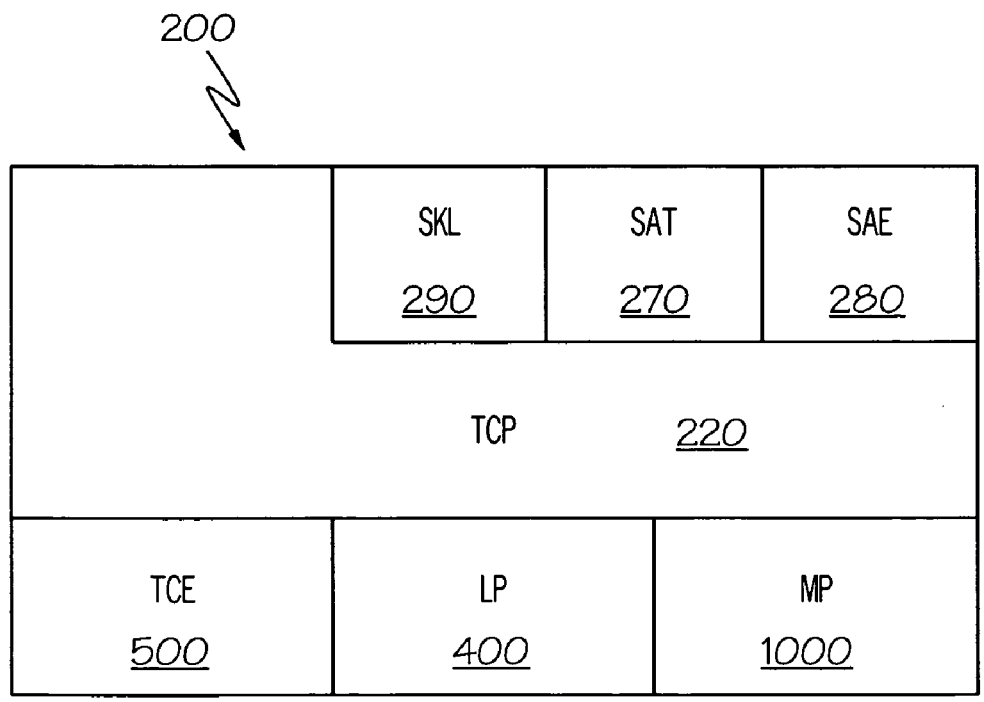
FIG. 2 illustrates a storage containing the transition costing program.

TCP 220 typically is stored in a memory, represented schematically as storage 200 in FIG. 2. The term "storage," as used herein, includes without limitation any volatile or persistent medium, such as an electrical circuit, magnetic disk, or optical disk, in which a computer can store data or software for any duration. A single storage may encompass and be distributed across a plurality of media. Thus, FIG. 2 is included merely as a descriptive expedient and does not necessarily reflect any particular physical embodiment of storage 220. As depicted in FIG. 2, though, storage 220 may include additional data and programs. Of particular import to TCP 220, storage 200 includes standardized activity tasks (SAT) library 270, standardized activity estimates (SAE) library 280, and skill level (SKL) library 290 with which TCP 220 interacts. TCP 220 components include transition cost estimator (TCE) 500, library program (LP) 400, and monitoring program (MP) 1000.

The SAT library 270 organizes tasks by customer and by server. Customer tasks are further divided into new or existing customer tasks. A distinction is made between new and existing customers because tasks to add services to existing customers will have a different SAE value since prior experience with the customer reduces time to accomplish the tasks. Server tasks are organized into type 1 servers and type 2 servers. Type 1 server tasks include tasks associated with base servers and/or logical partitions (LPAR) for each unique customer service including server and application set ups. Type 2 servers are servers that are identical to, or almost identical to the base server.

The on-demand operating environment of the present invention is based upon the concepts of a service oriented architecture (SOA). In an SOA, every application or resource is modeled as a service that implements a specific, identifiable function (or set of functions). In an on-demand environment, the services often implement specific business functions, but also may implement interfaces or other operating functions.

Services in SOAs communicate with each other by exchanging structured information, typically through messages or documents. The services' capabilities are defined by interfaces declaring messages they can produce or consume, policy annotations declaring a quality of service required or provided, and choreography annotations declaring behavioral constraints that must be respected in service interactions. The actual implementation of any specific service is hidden from the service requester, which allows new and existing applications to be quickly combined into new contexts.

Figure 3:
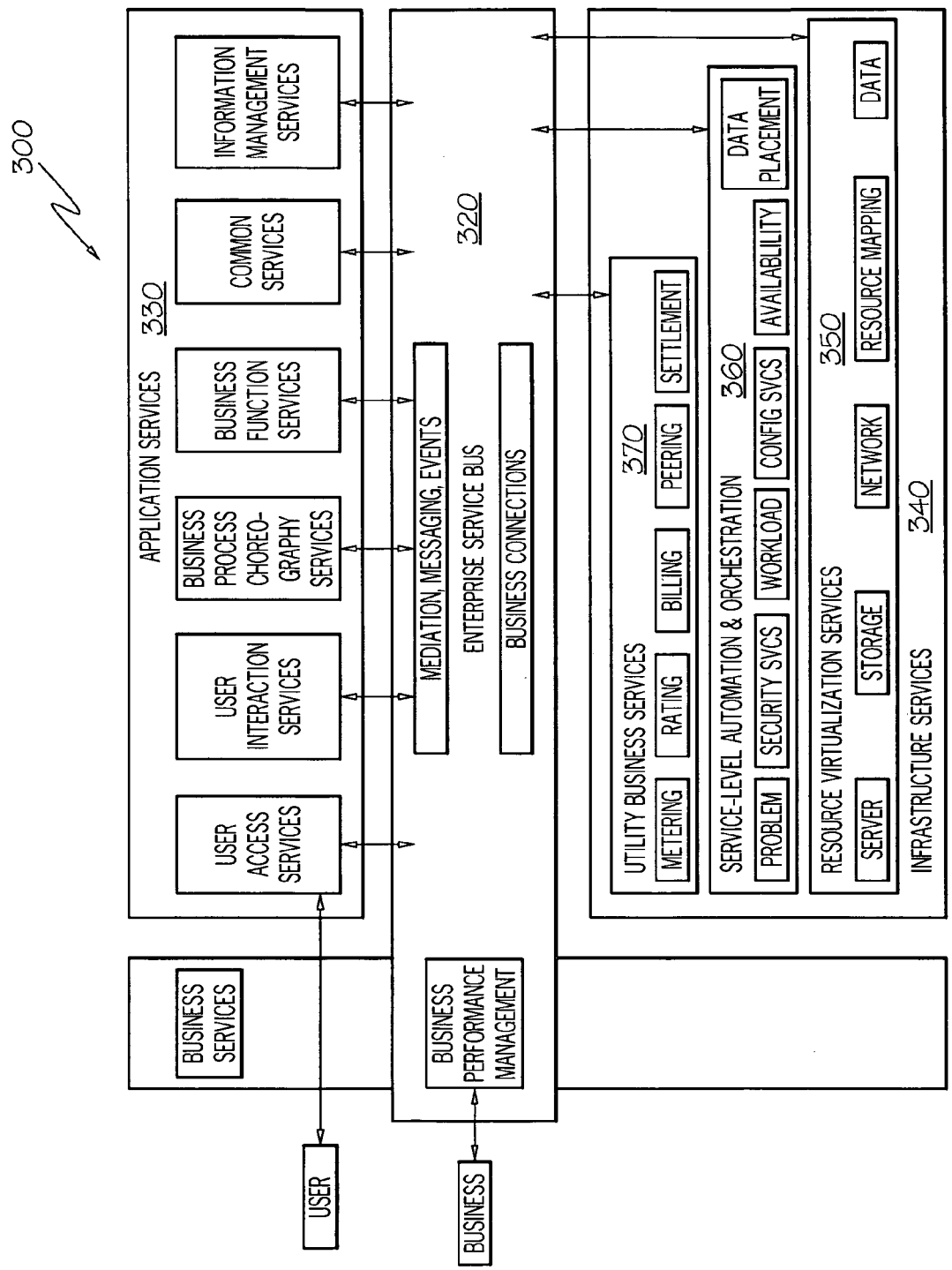
FIG. 3 illustrates an overview of a Service Oriented Architecture for an on-demand operating environment.

FIG. 3 provides an overview of SOA 300. At the system level, components of the environment are system objects such as servers, storage, and data. At the application level, components are dynamically integrated application modules that constitute sophisticated, yet much more flexible applications. At the business level, the components are business objects, defined for particular vertical industries or more generally, as they apply horizontally across industries.

Typically, a specific on-demand business service relies on many other services in its implementation. All interactions between services flow through an Enterprise Service Bus (ESB) such as ESB 320. ESB 320 facilitates mediated interactions between service end points. ESB 320 supports event-based interactions, as well as message exchange for service request handling. For both events and messages, mediations can facilitate interactions by, for example, locating services that provide requested capabilities, or by handling interface mismatches between requesters and providers that are compatible in terms of their capabilities. TCP 220 may be included with infrastructure services 340 in support of resource virtualization services 350, service-level automation & orchestration 360, and utility business services 370. Alternatively, TCP 220 may be employed independent from SOA 300.

Figure 4:
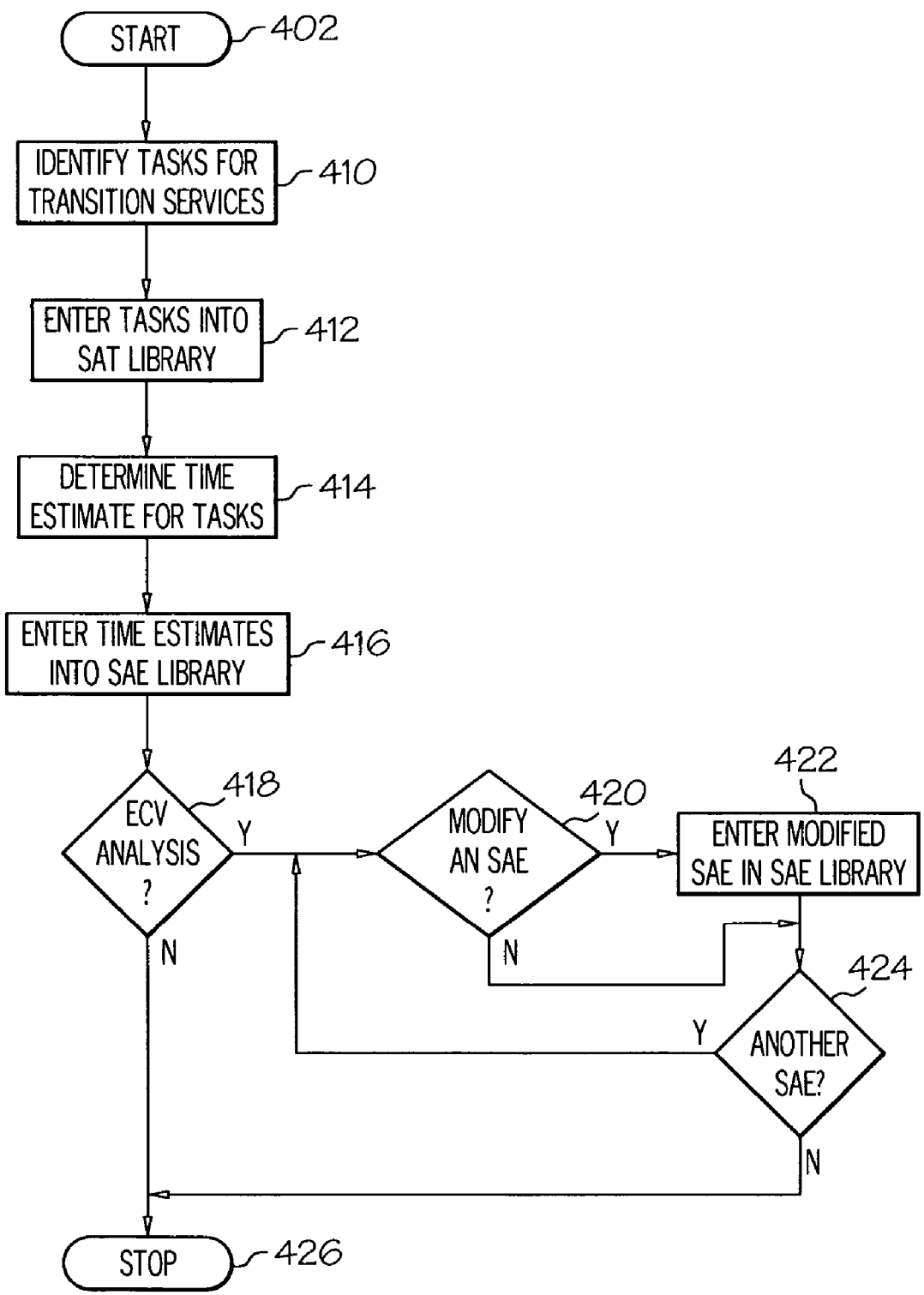
FIG. 4 depicts a flow chart of the library component of the transition costing program.

FIG. 4 depicts a flow chart of the library component of the transition costing program. The purpose of the library component is to provide a database of standardized activity tasks (SAT) and standardized activity estimates (SAE) that can be accessed by a user for entry into the transition cost estimator. The SAT library organizes tasks by customer and by server. Customer tasks are further divided into new or existing customer tasks. A distinction is made between new and existing customers because tasks to add services to existing customers will have a different SAE value since prior experience with the customer reduces time to accomplish the tasks. Server tasks are organized into type 1 servers and type 2 servers. Type 1 server tasks include tasks associated with base servers and/or logical partitions (LPAR) for each unique customer service including server and application set ups. Type 2 servers are servers that are identical to, or almost identical to the base server. LP 400 begins (402) and the user identifies activity tasks for inclusion in a database of standardized activity tasks (410). The user enters the tasks into the standardized activity task (SAT) library (412). Next, the user determines a standardized time estimate (SAE) for each of the SATs (414). In the preferred embodiment, the user obtains the time estimates from the appropriate subject matter expert (SME), but the time estimate can be derived from a historical database, or by any suitable method that meets the user's needs for accuracy. Once the user determines an SAE for each of the SATs, the user enters the SAEs into the SAE library where each SAE is linked to a corresponding SAT in the SAT library (416). A determination is made whether an end cost variance (ECV) analysis (418) has been conducted by monitoring program 1000. If so, a determination is made whether an SAE requires modification (420), and if so, the modified SAE is entered into the SAE library (422). If not, MP 400 goes to step 424. A determination is made as to whether another SAE is to be examined based on the ECV analysis (424), and if so, LP 400 goes to step 420. If not, LP 400 stops (426). Likewise, if at step 418, a determination is made that no ECV analysis has been conducted, LP 400 stops (426).

Figure 5:
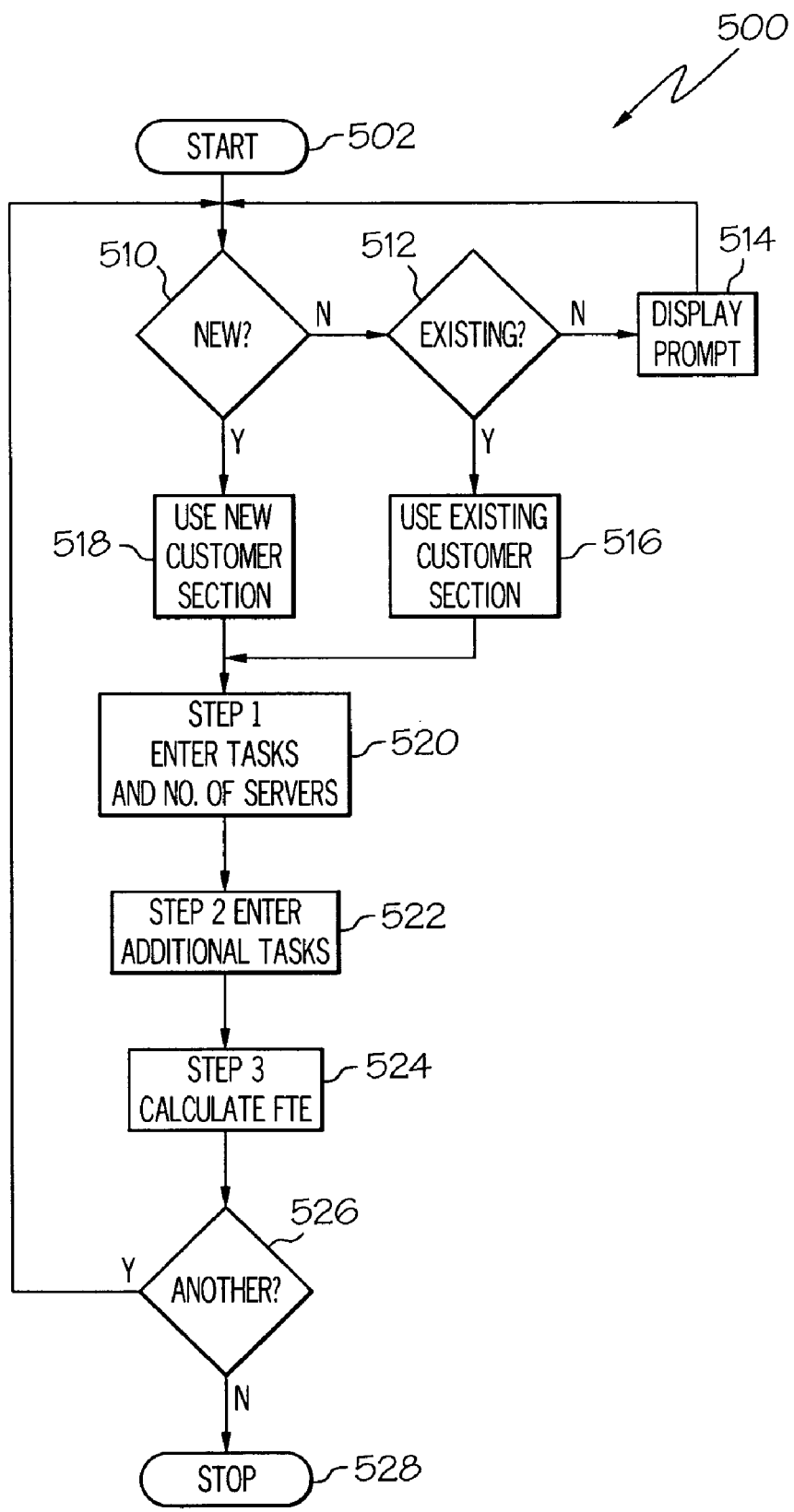
FIG. 5 depicts a flow chart of the transition costing estimator.

FIG. 5 depicts a flow chart of transition costing estimator (TCE) 500. TCE 500 begins (502) and a determination is made whether an SAE is to be entered for a new customer (510). If so, the user will enter SAEs into the new customer section of TCE 500 (510), and if not, a determination will be made whether an SAE is to be entered for an existing customer (512). If so, the user will enter SAEs into the existing customer section of the TCE 500. If not, a prompt will be displayed informing the user that data can only be entered into TCE 500 for a new customer or for an existing customer (514), and TCE 500 returns to step 510. The user then enters the SAEs using tabs discussed in FIGS. 6A-6D and enters the number of servers in the table of FIG. 7 (520). Next, the user enters additional tasks using the step 2 table of FIG. 8 (522). Finally, the user enters skill levels for each SAE in the step 3 table of FIG. 9. The skill levels may be entered individually, or they be populated to table 3 automatically from a skill level (SKL) library such as SKL 290 (see FIG. 2). If the SKL values are to be populated automatically to the step 3 table of FIG. 9, each SKL value will be linked to one or more SATs in the SAT library. Once the SKL values are entered into the step 3 table, TCE 500 calculates the FTE and displays the FTE values in the monthly FTE load column of FIG. 9 (524). TCE 500 determines whether there is another transition for which to calculate a cost estimate (526), and if so TCE 500 goes to step 510, or otherwise ends (528).

Figure 6A:
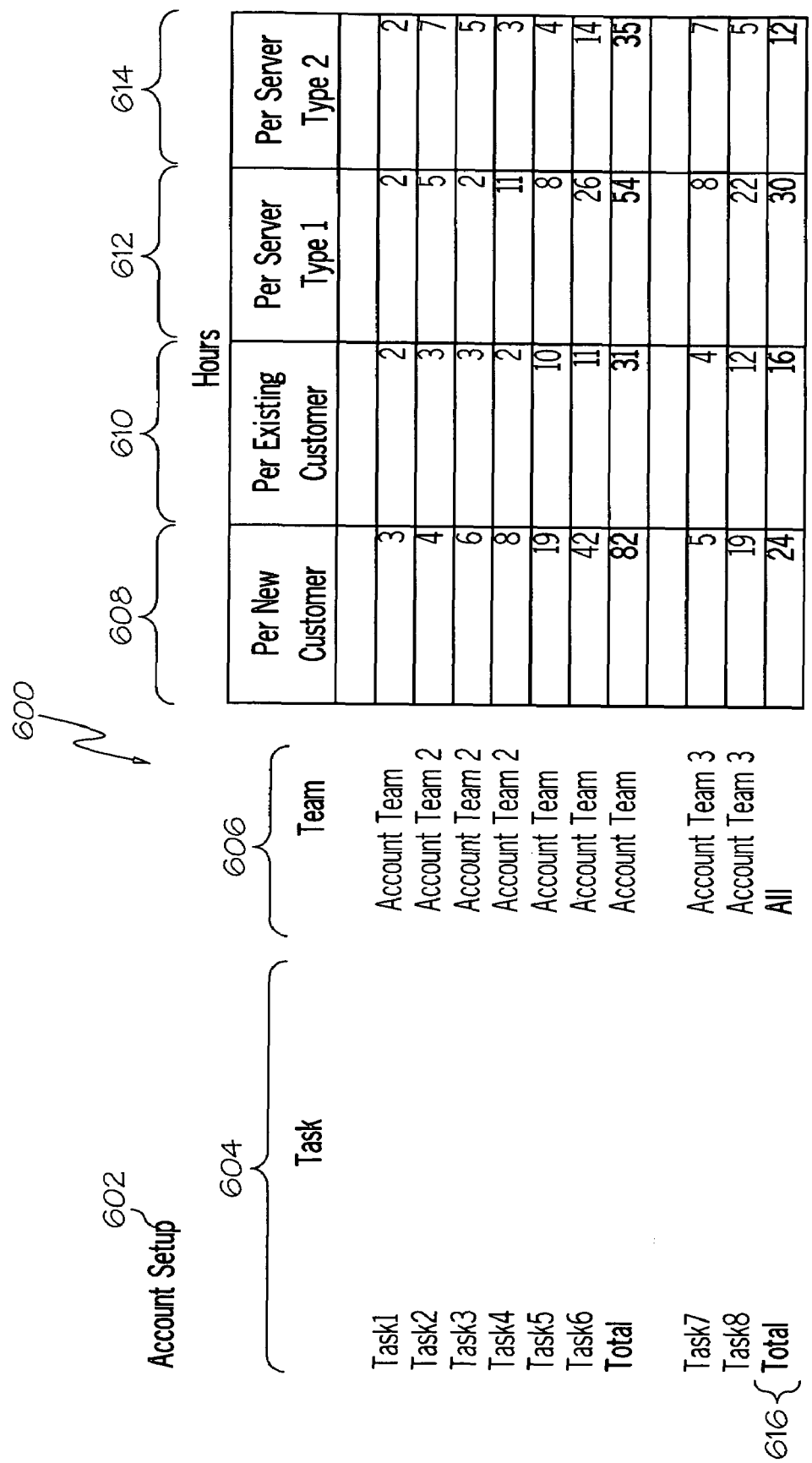
FIG. 6A depicts the account set up tab of the transition costing estimator.

FIG. 6A depicts the account setup tab of TCE 500. Account setup tab 600 has account tab identifying title 602, task column 604, and team column 606. Account setup tab 600 will display either new customer column 608 or existing customer column 610 depending on the determination at steps 510 and 512 of TCE 600 (see FIG. 5). Account setup tab 600 also displays a column for type 1 servers (612) and a column for type 2 servers (614). As tasks are entered into column 604, SAE values for each task by new or existing customer and by server type will be populated to either column 608 or column 610 and to columns 612 and 614. The total hours will be displayed in row 616.

Figure 6B:
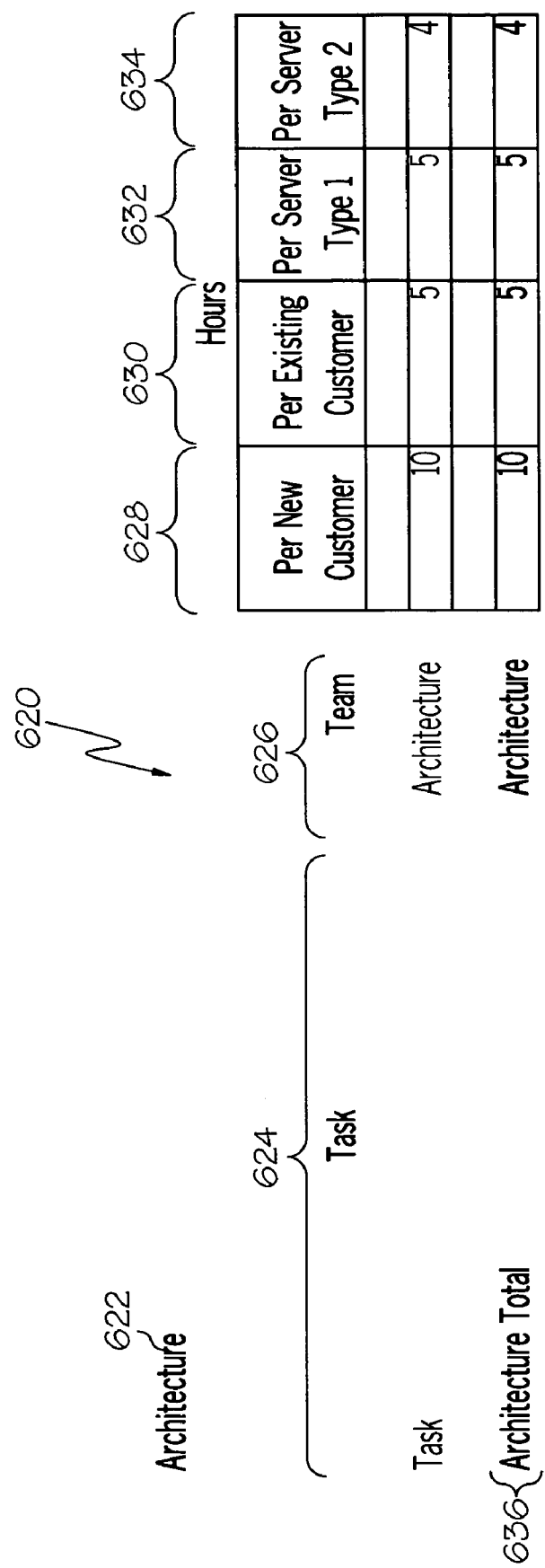
FIG. 6B depicts the architecture tab of the transition costing estimator.

FIG. 6B depicts architecture tab 620. Architecture tab 620 has architecture tab identifying title 622, task column 624, team column 626, new customer column 628, existing customer column 630, type 1 server column 632, and type 2 server column 634. Architecture tab 620 totals are displayed in row 636.

FIG. 6C depicts server tab 640. Server tab 640 has server tab identifying title 642, task column 644, team column 646, per customer column 648, type 1 server column 650, and type 2 server column 652. Totals for server tab 640 are displayed in server total row 654.

FIG. 6D depicts application tab 660. Application tab 660 has application tab identifying title 662, task column 664, team column 666, type 1 server columns 668, and type 2 server columns 670. Application total hours per application and server type are displayed in row 672.

FIG. 7 depicts step 1 table 700. Step 1 table 700 has step 1 table identifying title 702, transition task group column 704, hours per new customer column 706, hours per existing customer 718, hours per server type 1 710, number of servers type 1 712, total server type 1 hours 714, hours per server type 2 716, number of servers type 2 718, server type 2 hours 720, server labor total 722, new customer total 724, and existing customer total 726. Totals appear in row 728. Step 1 table 700 is populated from account set up tab 600, architecture tab 620, server tab 640, and application tab 660. The user must enter the number of servers for each type of server into column 712 and column 714. TCE 500 populates the values from the four tabs and calculates values for total server type 1 hours column 714 and total server type 2 hours column 720, server type 2 labor total 722, and either a new customer total 724 or an existing customer 726. Totals for each column are displayed in row 728.

FIG. 8 depicts Step 2 table 800. Step 2 table 800 has step 2 table identifying title 802, transition task group column 804, step 1 totals columns 806, step 2 inputs 808, and step 2 totals 810. Step 2 table 800 populates first section 816 of transition task group column 804 and step 1 totals columns 806 from step 1 table 700 (see FIG. 7). The user enters additional tasks in second section 812 of transition task group column 804 and the number of units into column 824 of step 2 inputs 808. The hours per unit column 822 may be populated with SAE if additional tasks correspond to SAT with linked SAEs, but if an additional task does not have an SAT for the user to select from the SAT library, then the user enters the hours into column 822. TCE 500 calculates step 2 totals and displays the totals in step 2 totals columns 810 which will be either new customer totals column 826 or existing customer totals column 828.

FIG. 9 depicts step 3 table 900. Step 3 table 900 has step 3 table identifying title 902, transition month window 903, window title 901, transition task group column 904, new customer columns 906 or existing customer columns 914. New customer column 906 has grand total column 908, skill level column 910, and monthly FTE load column 912. Likewise, existing customer column 914 has grand total column 916, skill level column 918, and monthly FTE load column 920. All of the columns except for skill level columns 910 and 918 are populated automatically by FTE 500. Skill level columns 910 and 918 may be populated automatically if team designations for account set up tab 600, architecture tab 620, server tab 640, and application tab 660 are linked to skill level values in SKL library 290 (see FIG. 2). Alternatively, SKL values may be entered into skill level columns 910 and 918 by the user. When the number of transition months has been entered into window 903, and the skill levels either populated or entered into skill level columns 910 or 918, FTE 500 calculates the total monthly FTE value and displays the values in row 922.

Figure 10:
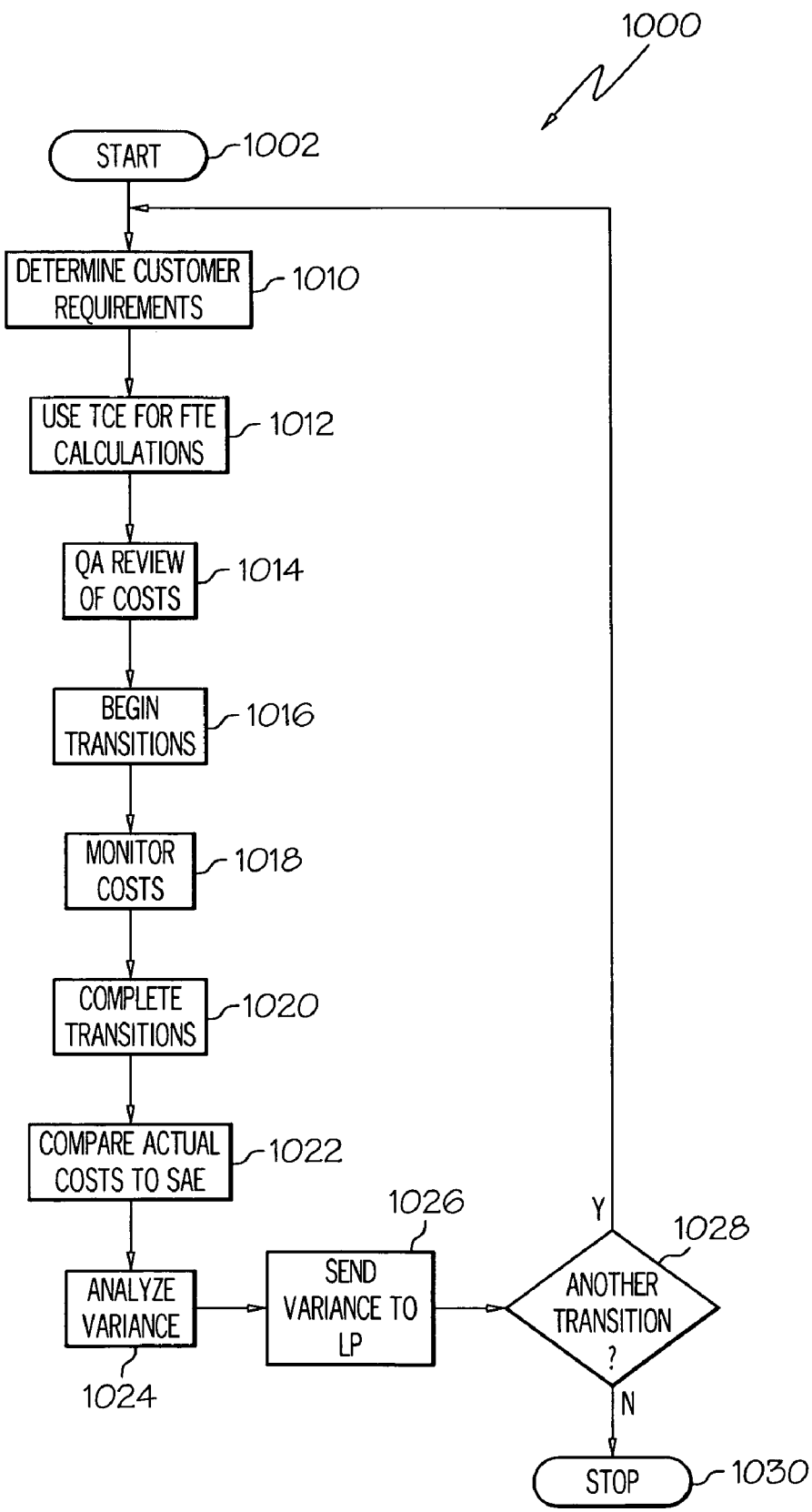
FIG. 10 depicts a flowchart of the monitoring component of the transition costing program.

FIG. 10 depicts monitoring program (MP) 1000. MP 1000 begins (1002) and the user determines customer requirements in terms of SATs (1010). TCE 500 calculates FTE values (1012). A quality assurance review of the costs in FTE is conducted (1014). The transition begins (1016) and costs are monitored during the transition period (1018). The transition is completed (1020), and the actual costs are compared to the SAE values selected from the SAE library and entered into TCE 500. Variances between the actual costs and the SAE values are analyzed (1024), and the variance, if any, is sent to SAE library 280 (see FIG. 2) (1026). A determination is made whether there is another transition (1028). If there is another transition, MP 1000 goes to step 1010, and if not, MP 1000 stops (1030).

Persons skilled in the art will realize that program TCP 220 and its components, TCE 500, LP 400, and MP 1000, may be embodied in various forms including separate programs, that TCP 220 may be applied in various combinations of software and hardware, and that TCP 220 may be embodied as a system, when applied within a particular architecture, or as a method employed either within or independently of a particular architecture. Additionally, persons skilled in the art will realize that the tables depicted in FIG. 6 through FIG. 9 may be displayed in a variety of forms including spreadsheets and graphical user interfaces.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed:

1. A method for calculating a cost for a transitioning of a customer in service oriented architecture on-demand environment comprising:

contracting with a customer to provide a plurality of services in the on-demand environment, wherein the services are provided by a service oriented architecture having a plurality of application services connected to a plurality of infrastructure services by an enterprise service bus; and using a program stored in a memory of a computer, the program containing a plurality of instructions adapted to cause a processor of the computer to perform steps comprising:

accessing a standardized activity tasks library containing a plurality of standardized activity tasks;

accessing a standardized activity estimate library containing a plurality of standardized activity estimate values, each standardized activity estimate value linked to one of the plurality of standardized activity tasks;

accessing a skill level library containing a plurality of skill level values, each skill level value linked to one or more of the plurality of standardized activity tasks;

displaying an interface with an account set up tab, an architecture tab, a server tab, and an application tab;

responsive to entering a plurality of tasks selected from the standardized activity tasks library and entering a plurality of teams corresponding to each of the plurality of tasks into the account set up tab, into the architecture tab, into the server tab, and into the application tab, and entering a number of servers, automatically populating a first table in the display with a plurality of standardized activity estimate values from the standardized activity tasks library corresponding to each of the plurality of tasks;

summarizing in a second table, a plurality of standardized activity estimate total values;

automatically populating to a third table, an eighth plurality of skill levels from the skill level library corresponding to each of the plurality of standardized activity estimate total values, and calculating and displaying in the third table, a grand total of hours, and a total monthly full time equivalent load for the transitioning of the customer; and wherein, the transitioning includes defining the resources to be applied to an plurality of needs of the customer for a service contract, placing the data and resources of the customer in operation, getting the customer to operate routinely within the on-demand environment, boarding the customer, or adding services to the customer.

2. The method of claim 1, further comprising:
monitoring a calculated transition cost during the transitioning so that a plurality of actual costs are tracked against the plurality of standardized activity estimates so that if a variance is detected between an actual cost and a standard activity estimate, the standardized activity estimate is reviewed.

3. An apparatus for calculating a cost for a transitioning of a customer in an on-demand environment comprising:
- a computer connected to a memory;
- a standardized activity tasks library containing a plurality of standardized activity tasks stored in the memory;
- a standardized activity estimate library containing a plurality of standardized activity estimate values, each standardized activity estimate value linked to one of the plurality of standardized activity tasks, stored in the memory;
- a skill level library containing a plurality of skill level values, each skill level value linked to one or more of the plurality of standardized activity tasks, stored in the memory;
- an enterprise bus of a service oriented architecture connecting a plurality of application services to a plurality of infrastructure services; and
- a program in the memory containing a plurality of instructions adapted to cause a processor of the computer to perform steps comprising:
  - displaying an interface with an account set up tab, an architecture tab, a server tab, and an application tab;
  - responsive to a first entry of a plurality of tasks selected from the standardized activity first tasks library and a second entry of a plurality of teams corresponding to each of the plurality of tasks into the account set up tab, into the architecture tab, into the server tab, and into the application tab, and further responsive to a third entry of a number of servers, automatically populating a first table in the display with a plurality of standardized activity estimate values from the standardized activity tasks library corresponding to each of the plurality of tasks;
  - summarizing in a second table, a plurality of standardized activity estimate total values; and
  - automatically populating to a third table, a plurality of skill levels from the skill level library corresponding to each of the plurality of standardized activity estimate total values, and calculating and displaying in the third table, a grand total of hours, and a total monthly full time equivalent load for defining a plurality of resources to be applied to a plurality of needs of a customer for a service contract, for placing the data and resources of the customer in operation, and for getting the customer to operate routinely within the on-demand environment.

4. The apparatus of claim 3, further comprising:
monitoring a calculated transition cost so that a plurality of actual costs are tracked against the plurality of standardized activity estimates, and when a variance is detected between an actual cost and a standard activity estimate, reviewing the standardized activity estimate.

5. A computer program product comprising:
- a computer readable medium;
- a program stored in the computer readable medium, the program containing a plurality of instructions adapted to cause a computer to perform steps comprising:
  - accessing a standardized activity tasks library containing a plurality of standardized activity tasks stored in the memory;
  - accessing a standardized activity estimate library containing a plurality of standardized activity estimate values, each standardized activity estimate value linked to one of the plurality of standardized activity tasks, stored in the memory;
  - accessing a skill level library containing a plurality of skill level values, each skill level value linked to one or more of the plurality of standardized activity tasks, stored in the memory;
  - displaying an interface with an account set up tab, an architecture tab, a server tab, and an application tab;
  - responsive to a first entry of a plurality of tasks selected from the standardized activity first tasks library and a second entry of a plurality of teams corresponding to each of the plurality of tasks into the account set up tab, into the architecture tab, into the server tab, and into the application tab, and further responsive to a third entry of a number of servers, automatically populating a first table in the display with a plurality of standardized activity estimate values from the standardized activity tasks library corresponding to each of the plurality of tasks;
  - summarizing in a second table, a plurality of standardized activity estimate total values; and
  - automatically populating to a third table, a plurality of skill levels from the skill level library corresponding to each of the plurality of standardized activity estimate total values, and calculating and displaying in the third table, a grand total of hours, and a total monthly full time equivalent load for defining a plurality of resources to be applied to a plurality of needs of a customer for a service contract, for placing the data and resources of the customer in operation, and for getting the customer to operate routinely within the on-demand environment.

6. The computer program product of claim 5, further comprising:
monitoring a calculated transition cost so that a plurality of actual costs are tracked against the plurality of standardized activity estimates, and when a variance is detected between an actual cost and a standard activity estimate, reviewing the standardized activity estimate.

* * * * *

UNITED STATES PATENT AND TRADEMARK OFFICE
CERTIFICATE OF CORRECTION

PATENT NO. : 7,580,901 B2 Page 1 of 1
APPLICATION NO. : 11/189935
DATED : August 25, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Fourteenth Day of September, 2010

David J. Kappos
*Director of the United States Patent and Trademark Office*